April 11, 1961     A. FRÖHLICH ET AL     2,979,123
TIRE BUFFING MACHINE

Filed Nov. 5, 1956     2 Sheets-Sheet 1

INVENTORS
ADOLF FRÖHLICH &
EDWARD J. HARRIS
BY
William Freeman
ATTORNEY

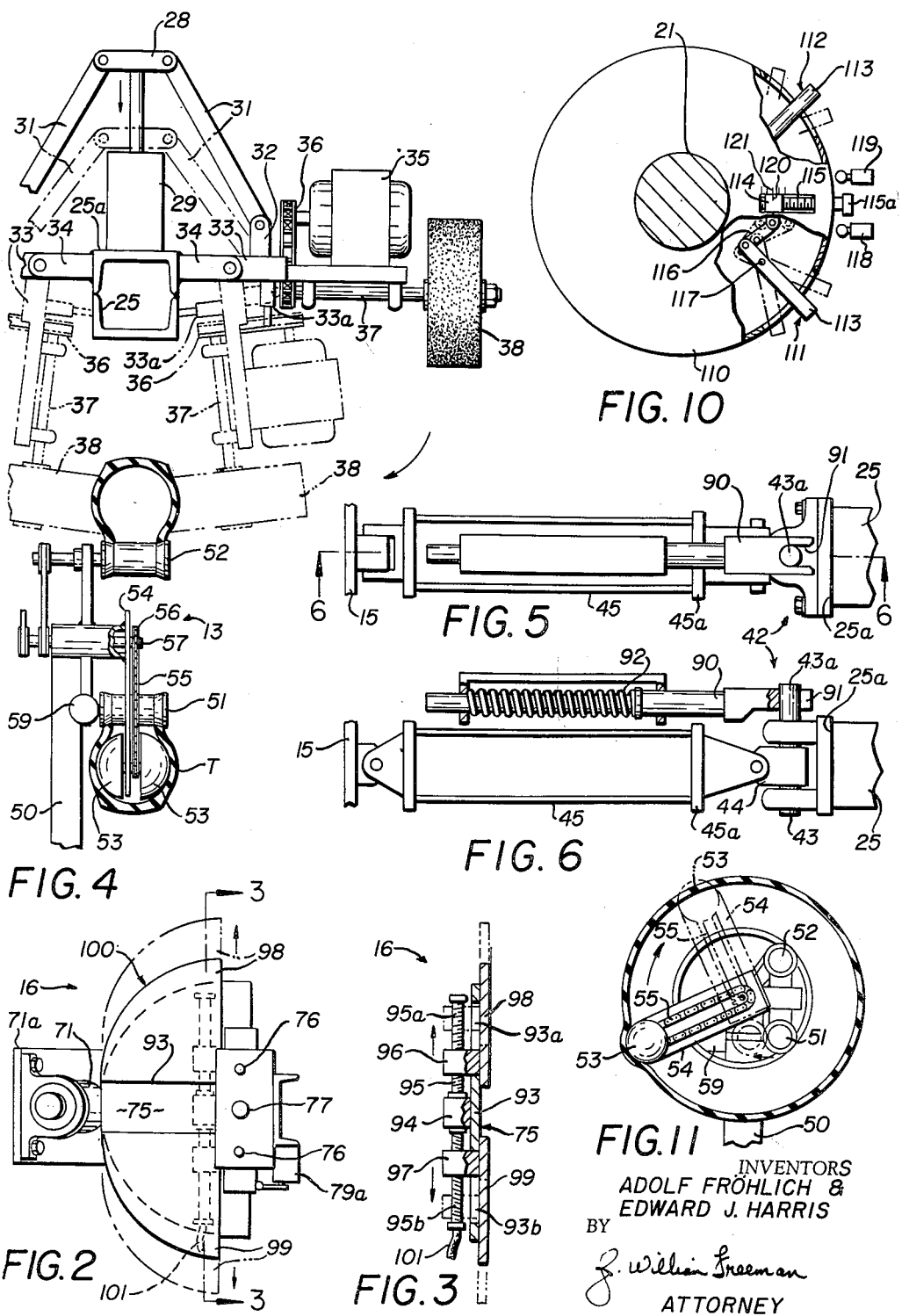

United States Patent Office 2,979,123
Patented Apr. 11, 1961

2,979,123

TIRE BUFFING MACHINE

Adolf Fröhlich and Edward J. Harris, Akron, Ohio, assignors to The Cleveland Trust Company, Cleveland, Ohio Filed Nov. 5, 1956, Ser. No. 620,411

9 Claims. (Cl. 157—13)

This invention relates to the art of retreading pneumatic tires, and in particular, has reference to improvements in buffing equipment that is used to prepare the exterior surface of a used tire carcass for a recapping operation.

In the known prior art of buffing pneumatic tires prior to recapping, it has long been known that the exterior crown surface of the used carcass must be buffed to remove excess tread stock that is present on same. In present devices, this buffing operation is normally confined to the exterior crown region of the tire, due to the fact that recapped tires, at the present time, are normally provided with new tread stock only in the crown region thereof.

However, with the development of certain newly introduced retreading procedures wherein the exterior surface of the worn carcass is covered from bead-to-bead, it has been found necessary that the sidewall portion of the tire be buffed as well as the crown region to which the tread is normally applied.

At the present time it has not been possible to utilize known prior art for this purpose in view of the fact that the same are incapable of being shifted through a path of movement that permits the sidewall, as well as the tread portion of the tire, to be buffed.

As an additional disadvantage in the known prior art, it has been found that the revolving brush normally employed therein is incapable of adjustment radially of the tire with the result that the machine in this present day prior art are normally limited to use for one size tire only. As a result of this confined adjustment, it is difficult and expensive to adjust the machine for use on additional sizes of tires.

In co-pending application, Serial No. 593,464, filed June 25, 1956, which matured into Patent No. 2,939,520, by Adolf Frohlich and Edward J. Harris there is disclosed an improved type of buffing machine that obviates the aforementioned difficulties with the known types of prior art.

In gereral, this machine operated on the principle that a revolving brush was oscillated about the axis of the rotating tire with the oscillation of the brush serving to keep the revolving brush in contact with the crown region of the tire so that the tread stock thereof could be removed.

While the above type buffing machine has been satisfactory, it has been found that improved results could be obtained by utilizing certain improvements thereto. For example, in the device disclosed in aforementioned co-pending application, there was a fixed depth of penetration determined as a result of the position of roller against a cam plate. This, in effect, required that the buffing unit remove all tread stock in one period of oscillation, with the result being that this arrangement caused the creation of unequal pressures during the tread removing operation so that difficulty would be encountered, for example, when a "low spot" was encountered.

It has been found that the aforementioned difficulty can be obviated by progressively advancing the buffing wheel towards the axis of rotation of the tire step-by-step, with this progressive advancement being timed to the oscillation cycle that the buffing wheel moves through. In this manner, each oscillatory movement of the frame results in the small amount of tread stock being removed, at which time, the device will be automatically indexed so as to increase the degree of penetration with respect to the axis of rotation of the tire with the result that the next oscillatory movement will result in additional tread stock being removed. In this manner, a progressive removal is effectuated of the tread stock with the result that equal pressures are maintained at all times to avoid the creation of unequal pressures.

As a further improvement over the device set forth in the above referred-to co-pending application, it has been found that the effective overall buffing range of this machine can be increased greatly by making the cam plate thereof in sections, and further, by making these sections adjustable relatively of each other so that the effective width of the oscillatory stroke can be varied to thus accommodate different widths of tires. Thus, for example, a 600:16 tire can be buffed in one operation and this can be immediately followed by the buffing of an 800:15 tire by merely widening the effective width of the cam plate.

It has also been discovered that improved operating conditions can be obtained by having the adjustment feature of the aforementioned cam plate operated and controlled by a calibrated dial setting that is positioned so as to be accessible to the user of the machine.

As a still further improvement over the aforementioned co-pending application, it has been found that by offsetting the driving rolls that contact the tire so that the same do not back up the buffing rasp, improved results will be obtained. Also, in this regard, it has been found that providing a rasp of a contoured configuration, that improved results will be obtained by increasing the uniformity of the buffing operation.

It accordingly becomes the principal object of this invention to provide an improved type of buffing machine characterized by the progressive removal of successive thicknesses of tread stock in the crown region of the pneumatic tire being buffed.

It is the still further object of this invention to provide such a progressive type of buffing operation that is timed in coaction with the oscillatory stroke of the buffing unit so that the depth of penetration will be progressively increased upon the execution of these oscillatory strokes of the buffing unit.

It is the still further object of this invention to provide an improved type of buffing machine that is capable of buffing, to contour, a wide range of tires varying in width and radial dimensions.

It is a still further object of this invention to provide an improved buffing machine characterized by the fact that the operating condition thereof can be manually set by the user by merely turning a dial.

It is the still further object of this invention to provide an improved type of buffing machine characterized by the presence of improved means for driving the tire received thereon and characterized by the presence of an improved type of buffing rasp that insures a uniformly buffed contour on the tire being serviced.

It is the still further object of this invention to provide an improved type of buffing machine as characterized by its extreme simplicity in operation over a wide range of tire sizes and styles.

These and other objects of the invention will become more apparent upon a reading of the following brief specification considered and interpreted in the light of the accompanying drawings.

Of the drawings:

Figure 1 is a side elevation of the improved buffing machine showing a tire received thereon for buffing.

Figures 2, 4, 5, 7, 9 and 10 are sectional views taken on the lines 2—2, 4—4, 5—5, 7—7, 9—9 and 10—10 respectively, of Figure 1.

Figure 3 is a section taken on the lines 3—3 of Figure 2.

Figure 6 is a section taken on the lines 6—6 of Figure 5.

Figure 11 is a schematic view showing in full and chain-dotted lines, the position of certain component parts of the tire-supporting means.

Figure 1:
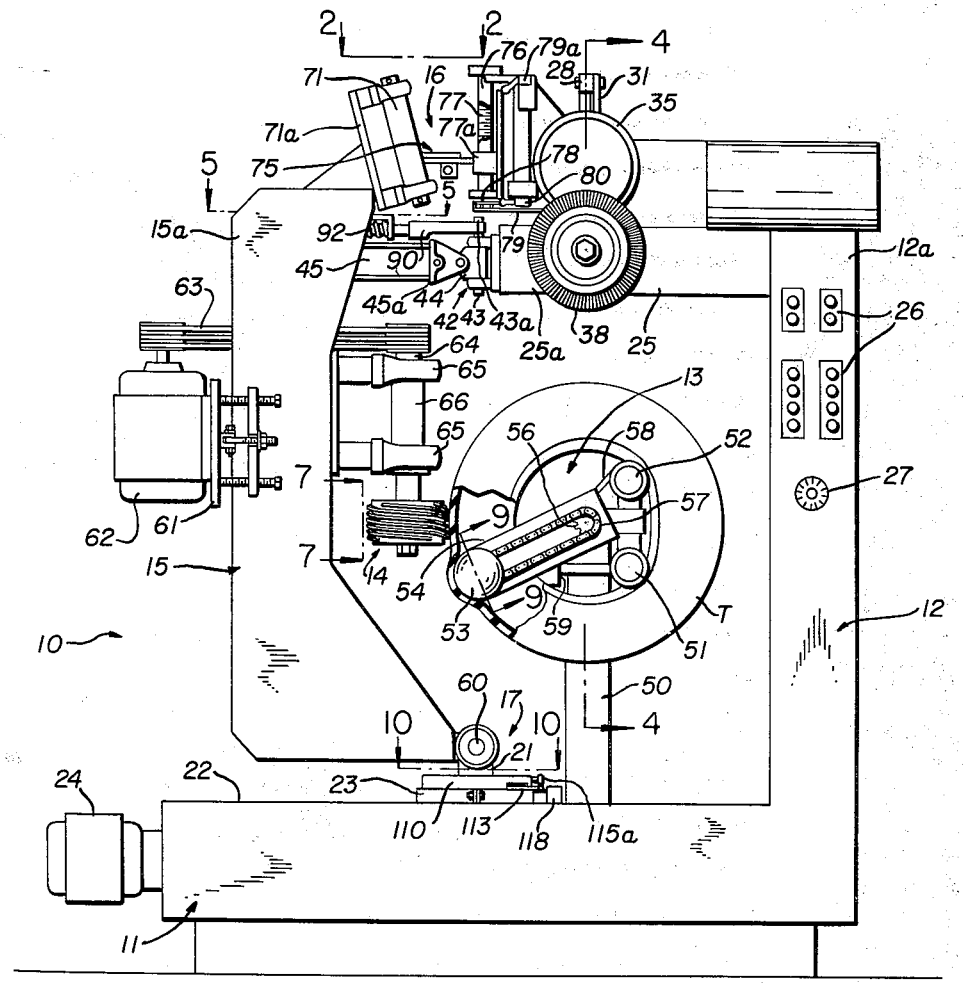

Referring now to the drawings and in particular to Figure 1 thereof, the improved buffing machine, generally designated by the numeral 10, is shown including a base 11, that defines, at one end thereof, an upright frame 12 and further includes the support means 13, that rotatably support thereon a tire T, so that the same may have the tread stock removed therefrom by a buffer 14; the arrangement being such that the buffer 14 is carried by an oscillating frame member 15 so that the depth of penetration thereof during oscillation of said frame member is controlled by cam means 16 that operate to control the spacing between the free ends of the frames 12 and 15 with indexing of the cam 16 and buffer 14 being initiated by contact between oscillating frame 15 and switch means 17.

In order that the invention might be more fully understood, the above-indicated component parts will be separately described, as will the overall operation of the improved method machine 10.

Base 11 and support frame 12

Considering first the structure of the base 11, it will be seen from Figure 1 of the drawings that the same comprises a rectangular box-like structure, that houses internally thereof a mechanism for oscillating a pin member 21 that projects from an appropriate boss member 23 that is provided on the top surface 22 thereof, with attachment of pin member 21 to the oscillating frame 15 being effectuated as will presently be described. To the end of providing a motivating force for oscillating the pin 21, as well as the frame member 15, there is also provided a motor 24 that connects, through appropriate drive mechanism inside base 11 to oscillate the pin 21 transversely of the surface 22.

As shown in Figure 1 of the drawings, the upright frame 12 is disposed adjacent the right-hand end of the base member 11 and extends upwardly therefrom so as to define an upper end 12a that defines an integral cross frame indicated by the numeral 25 that operates to support various component parts of the cam mechanism 16 as will presently be described. In addition to the aforementioned structure, the upright frame 12 includes a series of switches 26, 26, as well as a control dial indicated by the numeral 27, the arrangement being such that the buttons 26, 26, are operable to energize various motors and switches throughout the electrical system employed, while the dial 27 operates to set operating width of certain components of the cam operating mechanism 16, as will presently be described.

The support frame 12 also serves to carry certain auxiliary buffing equipment and to this end, as best shown in Figure 4 of the drawings, the frame 25 has, extending from the upper surface thereof, a piston head 28 that is relatively movable with respect to the frame 25 as a result of its attachment to a piston member 29 that operates to move the same between full and chain-dotted line positions of Figure 4.

As best shown in Figure 4, each opposed side portions of the piston head 28 pivotally receives a link member 31 that is, in turn, pivotally connected at its opposed end with an arm 32 that is fixed to a support arm 33 that has a free end thereof pivotally secured to a bracket 34 that is mounted on one leg of the frame member 25. In addition, the support arm 33 receives thereon a motor 35 that drives, through chain 36 and shaft 37, a buffing wheel 38, it being understood that two such buffing wheels 38, 38 are contemplated in the preferred embodiment of the invention herein disclosed.

In order that length of pivotal arc of the arm 33 may be varied, the same is shown including an adjustable stud 33a, that strikes, upon arcuate movement, the side of frame 25 as shown in Figure 4. This controls the position of buffer 38 against the sidewall of the tire T when the same has been moved to the chain-dotted line position of Figure 4.

In addition to the aforementioned component parts, the inboard end 25a of the frame member 25 also defines a swivel joint indicated generally by the numeral 42 and having a pin 43 received therethrough so as to permit a bushing 44 to be pivotally mounted to the free end 45a of a piston 45 that has its opposed edge connected to the frame member 15. In this manner, the piston 45 may rotate about the axis of the pin 43 and may further be extended so as to vary the spacing of the arm 15 with respect to the inboard end 25a of the frame 25.

Tire supporting means 13

As previously indicated, the tire-supporting means 13 rotatably support a tire T about an axis of rotation with the intended purpose being to rotate the tire T about this axis of rotation so that the exterior surface thereof may be buffed by the revolving buffing wheel 14 as will presently be described.

To this end, the tire-supporting means 13 are shown mounted upon an upright frame member 50, that extends vertically from the central portion of the base 11 so as to support an idler roll 51, a driven roll 52, and a pair of hemispherical ball members 52, 53; the arrangement being such that the ball members 53, 53 are mounted at the end of an arm 54, that is pivoted around shaft 57 so as to be movable between the full and chain-dotted line positions of Figure 11, with chain 55 effectuating drive of these balls by action around sprocket 56 that is mounted on shaft 57. Also received on shaft 57 is a sheave (not shown) that drives, through belt 58, the roller 52. In order that the tire may be tightly held during rotation thereof, the idler roller 51 is shiftable horizontally as a result of its mounting on a piston 59. In this manner the roller 51 may be tensioned against the bead (see Figure 11) so as to insure a positive drive.

It is important to note that the position of the ball members 53, 53, as best shown in Figure 1 of the drawings, is such that the same contact the interior surface of the tire T at a point slightly below the horizontal point of contact between the exterior surface of the tire and the revolving buffer 14. By offsetting the ball members in this manner, it is apparent that the distortion or bulging of the tire (exaggerated in Figure 1 for clarity) occurs in the region spaced from the point of contact with buffer 14, with the result that there is no backing surface behind the tire T at its point of contact with the buffer 14. In this manner, the buffer 14 will be operating against a flexible surface with the result that a highly improved and uniform type of buffing will be obtained.

Oscillating frame 15 and buffer 14

As has been previously indicated, the oscillating frame 15 is hinged, through cross pin 60, to the pin member 21 so that the same may move arcuately about the axis of its pin 60, while also being capable of oscillating laterally of the surface 22 to permit the buffer 14 to buff, from bead to bead, a tire that is mounted on tire-supporting means 13. To this end, the pin 60 hingedly supports the oscillating frame 15 with respect to the base 11, while the upper end 15a of the oscillating frame, is secured, as has been previously indicated, to the free end of the piston 45 so that actuation of the piston 45 operates the pivot the entire oscillating frame 15 about a hinge point that is defined by pin 60. In like manner, oscillatory movement of the frame 15 laterally of the surface 22 is effectuated by gearing of the type set forth in co-pending application, Serial No. 593,464, filed June 25, 1956, by Adolf Frohlich and Edward J. Harris, and accordingly a detailed recitation of that mechanism is not set forth herein for the sake of clarity.

Also, as shown in Figure 1 of the drawings, the central portion of the frame 15 includes a mounting plate 61 to which is secured a motor 62; the arrangement being such that motor 62 drives belt 63, that in turn, drive shaft 64 upon which the revolving buffer 14 is mounted, with bearings 65, 65 and bushing 66 being employed to facilitate rotational movement of the shaft 64 in known manner.

Figure 7:
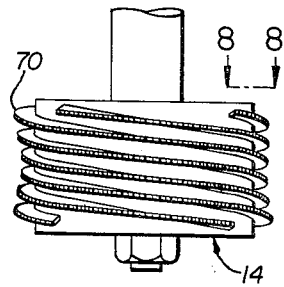
Figures 8, 9:
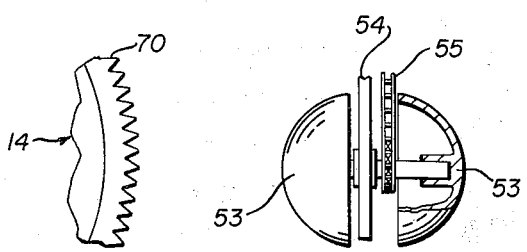
Figure 8 is a section taken on the lines 8—8 of Figure 7.

Turning next to Figure 7 for a consideration of the detailed structure of the buffer 14 it will be seen that the same includes a steel rasp having a plurality of disc-like members 70, 70 arranged spirally of the axis thereof so as to be presented in spiral-like form, with several series of such discs 70, 70 being incorporated in each buffing unit 14. Additionally, the buffing wheel 14 may be concave throughout its axial length in cross-sectional configuration, with such concave cross-sectional configuration serving to provide a more effective contact between the buffing wheel 14 and the tire T as a result of the complemental contact of the two elements just described.

*Cam means 16*

As previously indicated, the cam means 16 are operable, as a result of the coaction between the component parts hereof, to vary the position of the oscillating frame 15 with respect to the axis of rotation of a tire that is supported on the previously described tire-supporting means 13.

To this end, the upper end 15a of the oscillating frame 15 is provided with a plate 71a that has journalled thereon a roller 71. Receivable against the roller 71, as best shown in Figure 2 of the drawings, is a cam plate generally indicated by the numeral 75, that is shiftable axially of guide rods 76, 76, as a result of axial movement of a threaded nut 77a along a threaded shaft 77. This threaded shaft 77a has also defined at one axial end a sprocket 78 that receives a chain 79 that is in turn played about the drive sprocket of a motor (not shown). In this manner, rotation of the motor will cause the sprocket 78 to turn the shaft 77 so as to axially shift the nut 77a thereon. This movement will cause the nut 77a to move axially of shaft 77 and upward (Figure 1) movement of nut 77a will operate to raise the elevation of the cam 75 so that the roller 71, together with the entire frame 15 will be moved to the right of Figure 1 of the drawings. Solenoid switches 79a and 80 that are provided adjacent the top and bottom portions of the guide rods 76, 76, operate, as hereinafter described, to control advancement of the nut 77a on threaded shaft 77.

For the purpose of effectuating a steadying action during the oscillation of the frame 15, the upper end 15a thereof also includes a yoke member 90 that has an open end 91 thereof (see Figure 5) received about an upper extension 43a of pin member 43. This yoke is urged away from the upper end of the frame 15a by springs 92 so that a constant force is exerted by the open end 91 against portion 43a of the pin 43, with such constant force being continually exerted during oscillation of the frame 15.

Turning next to Figures 2 and 3 for a detailed consideration of the cam template 75, it will be seen that the same is of an adjustable type wherein a pair of split templates 98 and 99 move relatively of a base plate 93 to facilitate adjustment of the template 75. To this end, the base plate 93 has a boss 94 on the underside thereof that receives therethrough a screw 95. This screw 95 has threaded sections 95a and 95b that are opposite to each other and received in appropriate threaded apertures of lug members 96 and 97. These lug members 96 and 97 extend downwardly from the underside of split templates 98 and 99 respectively and are movable in slots 93a, 93b of base plate 93. In this manner, the rotation of the screw 95 will result in templates 98 and 99 being moved relatively of each other so that the overall distance of the cam edge, designated generally by the numeral 100, can be increased or decreased.

In the preferred embodiment of the invention such separating movement of the template 75 is controlled as a result of the connection of a flexible conduit 101 to a dial 27, with a turning of the dial 27 operating to regulate the spacing gap between the split templates 98, 99 with the edge portion of the template 93 being in registry with the edge portions of split templates 98 and 99 so that a continuous cam edge is provided.

*Switch means 17*

As previously indicated, the switch means 17 operate to index the cam means 16 upon each oscillatory stroke of frame 15 so that buffer 14 is progressively advanced towards the exterior surface of a tire T that is carried on tire-supporting means 13.

To this end, a circular plate 110 is carried on the pin 21 so as to move therewith during the reciprocatory oscillation of the same. As indicated in Figure 1, the underside of plate 110 is undercut so as to house a pair of linkages 111 and 112 that include, in each case, a projecting arm 113 that extends beyond the periphery of plate 110 with the arcuate spacing between the arms 113, 113 being controlled as a result of the position of nut 114 on threaded adjustment shaft 115. In this regard, the nut 114 interconnects on each side with a link 116 that in turn pivotally interconnects with the inboard ends of each arm 113. In this manner, pivoting of each link 113 around a pivot point 117 permits the position of the links 113, 113 to be varied upon axial shifting of nut 114 as by turning the exposed end 115a of shaft 115.

For the purpose of providing reversing action, the surface 22 of base 11 also includes switch members 118, 119 that are engaged by the moving arms 113, 113 so that upon contact between an arm 113 and a switch member the direction of rotation of pin 21 will be reversed. It is also contemplated that the nut 114 include a pointer arm 120, 120 that overlies a series of graduations 121 provided on the upper (Figure 10) surface of plate 110. In this manner, the arcuate spacing between the arms 113, 113 can be set by setting the pointer 120 to the proper graduation 121.

*Operation of the device*

In use or operation of the improved device, it will first be assumed that the component parts have been assembled as indicated in Figure 1 of the drawings and further, that the tire-supporting means 13 have been positioned as shown in chain-dotted lines in Figure 11 of the drawings with the ball members 53, 53 being somewhat elevated above the horizontal plane of the buffing wheel 14.

At this time, it is merely necessary that a tire T be fitted over the ball members 53, 53 and adjusted until such time as the inner bead edge thereof is in alignment with the rollers 51 and 52. Upon movement of the ball members 53, 53 around shaft 57, and upon further shifting of idler roll 51 to the full line position of Figure 11, the tire T will be fixedly mounted about an axis of rotation that is defined by shaft 57. Prior to such shifting, however, it will first be assumed that the template 75, as well as the nut 77a, has been positioned adjacent the lowermost portion of the guide rails 76, 76. It will be further assumed that the pointer 120 of switch means 17 has been set so as to provide the required arcuate spacing between the arms 113, 113 so that the proper oscillatory stroke of frame 15 will occur upon energization of motor 24, with the proper width of template 75 having been obtained by setting dial 27.

At this time, the motor 62 may be energized to initiate rotation of the buffing wheel 14, whereupon, the rotating buffing wheel 14 may be shifted into adjacency with the tire T by operating piston 45 with the extent of such movement being limited by contact between roller 71 and template 75. After positioning of frame 15 as just described, the motor 24 may be operated to initiate oscillation of the frame 15 transversely of the surface 22 of base 11, with reversing of the oscillatory stroke being accomplished by repetitive contact between arms 113, 113 and switches 118, 119. Each such contact will operate to additionally energize a motor that will, for a short time, move sprocket 78 so that shaft 77 will turn and accordingly slightly raise the nut 77a as well as the template 75. As the template moves upwardly in this manner, the buffer 14 will penetrate deeper and deeper into the tire T, which now may be revolving, with the limit of such penetration being determined when nut 77a strikes limit switch 79a which may be adjusted to any vertical height.

At this time, it is merely necessary that the piston 45 be operated to move the frame 15 counter-clockwise of Figure 1 at which time the tire-supporting means 13 can be collapsed and the tire removed therefrom.

In the event that the next tire to be buffed on the machine has a wider width, it is merely necessary that the dial 27 be set accordingly, with such setting of the dial 27 operating to spread the split cams 98 and 99 apart as a result of the rotation of the screw member 95 and particularly, as a result of same being provided with opposite hand threads 95a, 95b that are located adjacent the respective opposed axial ends thereof.

When the template has been set by use of the dial 27 as just indicated, it is merely necessary that the tire to be buffed be placed upon the collapsed tire-supporting means 13, at which time the same can be expanded to the full-line position of Figure 11 with rotation commencing for repetition of the buffing cycle repeated as above described.

It will be seen from the foregoing that there has been provided a new and novel type of buffing apparatus characterized by the repetitive advancement of a revolving buffing wheel across the peripheral surfaces of a revolving tire with the result that gradual amounts of tread stock are progressively removed from the crown and shoulder surfaces of the tire with a minimum of effort and a maximum of accuracy.

It has been shown how the use of a split template operates to control the extent and nature of the oscillating movement with the result that the tire can be buffed to contour regardless of the width thereof and in this particular regard, it is to be noted that by extending the split template as described above, that the required "flat contour" can be uniformly obtained regardless of the width of the tire being buffed. In this regard, it is to be noted that this is in definite contrast to the known types of prior art devices whereby mere arcuate rotation of the buffing wheel results in the creation of an arcuate round in the crown region. By use of this improved buffer, a minimum amount of tread stock is necessary to fill out the matrix cavity due to the fact that the tire is buffed to true contour.

It has been further shown how the use of revolving driving balls that are off-set with respect to the horizontal plane of the buffing unit, operate to permit free contact of the tire T with the revolving brush with the result that irregularity in thickness does not result in carcass penetration at these points and highly worn or flat spots on the tread will likewise lend themselves to being buffed due to this flexibility together with some firmness due to the off-set. This further permits a balancing effect to take place since high spots are taken down to circumferential parallelism with low spots.

While a detailed description of the invention has been set forth herein in accordance with the dictates of the Patent Statutes, it is not intended that the application should be so limited.

Accordingly, when the term "buffing wheel" has been used, it is to be understood that any known type of buffing wheel is contemplated for use herein and similarly, the use of such terms as "cam" and "roller," are to be used in their broader sense. Similarly, the offsetting of the rasp may be above as well as below the horizontal point of contact if desired.

It accordingly follows that modifications of the invention may be resorted to without departing from the spirit hereof or the scope of the appended claims.

What is claimed is:

1. A tire-buffing machine of the character described, comprising; a base; a support frame projecting substantially normal to said base; tire-supporting means carried by said base and defining an axis of rotation substantially parallel to said base; a second elongate frame hinged at one end thereof to said base and projecting therefrom in the same direction as said first frame; buffing means carried by said second frame adjacent a central portion thereof; means for oscillating said second frame about said axis of rotation, shifting means moving said buffing means towards and from said axis of rotation; and indexing means actuating said shifting means during each oscillation of said second frame, whereby said buffing means may be progressively advanced towards said axis of rotation.

2. A tire-buffing machine of the character described, comprising; a base; a support frame projecting substantially normal to said base; tire-supporting means carried by said base and defining an axis of rotation substantially parallel to said base; a second elongate frame hinged at one end thereof to said base and projecting therefrom in the same direction as said first frame; buffing means carried by said second frame adjacent a central portion thereof; means for oscillating said second frame about said axis of rotation, shifting means moving said buffing means towards and from said axis of rotation; and indexing means actuating said shifting means during each oscillation of said second frame, whereby said buffing means may be progressively advanced towards said axis of rotation; and another buffing means including a pair of rotatable buffing elements hinged to said support frame and being movable into and out of contact with a tire received on said tire-supporting means.

3. The device of claim 2 further characterized by the fact that said buffing elements are shiftable with respect to their hinge point whereby their arc of movement may be varied.

4. A tire-buffing machine of the character described, comprising; a base; a support frame projecting substantially normal to said base; tire-supporting means carried by said base and defining an axis of rotation substantially parallel to said base; a second elongate frame hinged at one end thereof to said base and projecting therefrom in the same direction as said first frame; buffing means carried by said second frame adjacent a central portion thereof; means for oscillating said second frame about said axis of rotation, shifting means moving said buffing means towards and from said axis of rotation; and indexing means actuating said shifting means during each oscillation of said second frame, whereby said buffing means may be progressively advanced towards said axis of rotation; said shifting means including a cam and roller carried by said frame members; the position of said cam against said roller controlling the spacing of said buffing means from said axis of rotation.

5. The device of claim 4 further characterized by the fact that said roller is inclined and said cam advances axially thereof during oscillation of said second frame.

6. The device of claim 4 further characterized by the fact that said cam defines a flat plate having an arcuate edge portion engaging said roller; said plate being split into two sections and means for moving said sections apart whereby the length of said arcuate edge portion may be increased.

7. A tire-buffing machine of the character described, comprising; a base; a support frame projecting substantially normal to said base; tire-supporting means carried by said base and defining an axis of rotation substantially parallel to said base; a second elongate frame hinged at one end thereof to said base and projecting therefrom in the same direction as said first frame; buffing means carried by said second frame adjacent a central portion thereof; means for oscillating said second frame about said axis of rotation, shifting means moving said buffing means towards and from said axis of rotation; and indexing means actuating said shifting means during each oscillation of said second frame, whereby said buffing means may be progressively advanced towards said axis of rotation; said tire-supporting means including a driven roll positionable adjacent said buffing means in spaced relationship therewith whereby a tire received thereon will be contacted on its exterior surface by said buffing means; said point of contact between a tire and said buffing means being arcuately offset with respect to the point of contact between said driven roll and said interior surface of said tire.

8. A cam template for buffing machines of the character described, comprising; a flat plate, having an elongate edge; a pair of second plates superimposed on said first plate and having cam edges overlying said cam edge of said first plate; and means for moving the cam edges of said pair of plates longitudinally of said cam edge whereby the overall length of said combined cam edges may be varied.

9. A method of removing tread stock from a continuously rotating tire, comprising the steps of; transversely buffing away rotating tread stock in alternately opposed directions; periodically increasing the depth of said buffing penetration following completion of a predetermined number of said transverse buffings.

References Cited in the file of this patent
UNITED STATES PATENTS

| | | |
|---|---|---|
| 1,851,156 | Calahan | Mar. 29, 1932 |
| 1,953,750 | Dacon et al. | Apr. 3, 1934 |
| 2,005,799 | Nicholson et al. | June 25, 1935 |
| 2,259,820 | James | Oct. 21, 1941 |
| 2,333,599 | Terry | Nov. 2, 1943 |
| 2,489,803 | Neilsen | Nov. 29, 1949 |
| 2,524,489 | Strong | Oct. 3, 1950 |
| 2,649,665 | Anderson et al. | Aug. 25, 1953 |
| 2,675,073 | Constantakis | Apr. 13, 1954 |
| 2,707,851 | Strong | May 10, 1955 |
| 2,788,851 | Rawls et al. | Apr. 16, 1957 |
| 2,864,444 | Glodde | Dec. 16, 1958 |